(No Model.) 2 Sheets—Sheet 1.

H. WOODCOCK.
CLAY WASHING MACHINE.

No. 410,819. Patented Sept. 10, 1889.

WITNESSES: Phil. C. Dietrich. C. Sedgwick.

INVENTOR: H. Woodcock
BY Munn & Co.
ATTORNEYS (No Model.) 2 Sheets—Sheet 2.

H. WOODCOCK.
CLAY WASHING MACHINE.

No. 410,819. Patented Sept. 10, 1889.

WITNESSES:
Phil. C. Dieterich
C. Sedgwick

INVENTOR:
H. Woodcock
BY Munn & Co.
ATTORNEYS.

UNITED STATES PATENT OFFICE.

HENERY WOODCOCK, OF PERTH AMBOY, NEW JERSEY.

CLAY-WASHING MACHINE.

SPECIFICATION forming part of Letters Patent No. 410,819, dated September 10, 1889.

Application filed December 21, 1888. Serial No. 294,252. (No model.)

*To all whom it may concern:*

Be it known that I, HENERY WOODCOCK, of Perth Amboy, in the county of Middlesex and State of New Jersey, have invented a new and useful Machine for Washing Clay, of which the following is a full, clear, and exact description.

My invention relates to an improvement in machines for washing clay, and has for its object to provide an apparatus of simple and durable construction adapted to receive clay taken, if desired, directly from the bank, and to expeditiously and thoroughly cleanse the same of all foreign matter, and wherein the clay will also be reduced to the proper consistency for manufacturing various articles.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
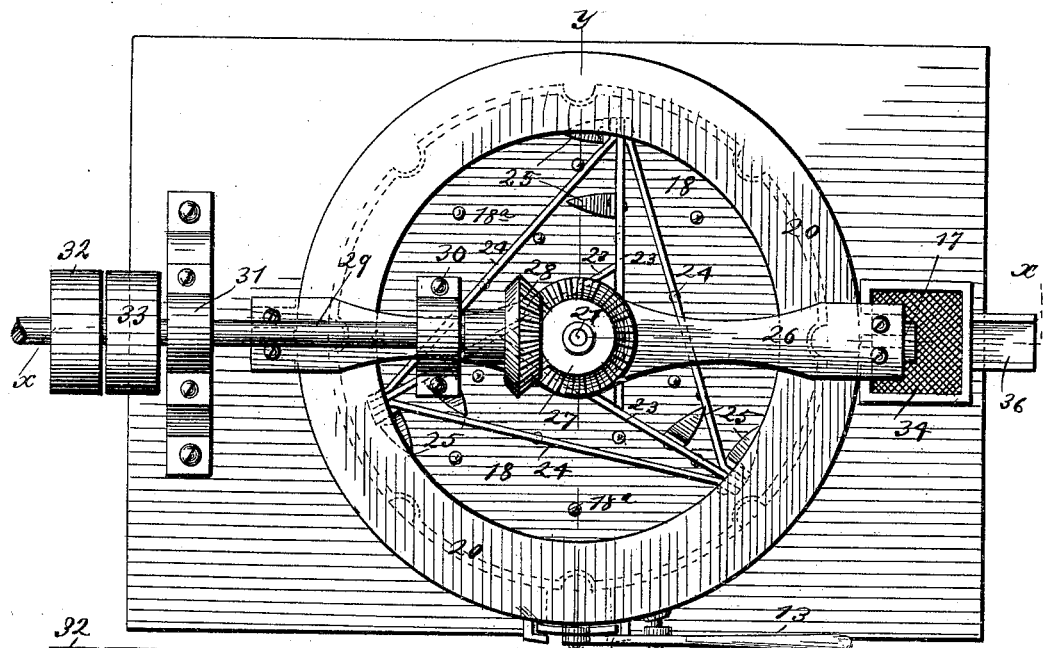
Figure 2:
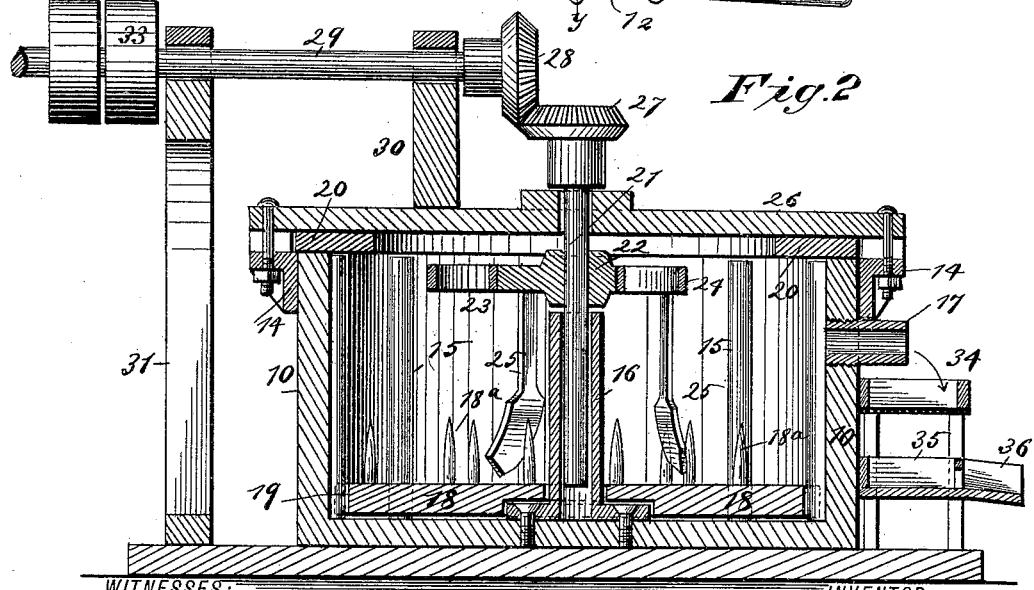
Figure 3:
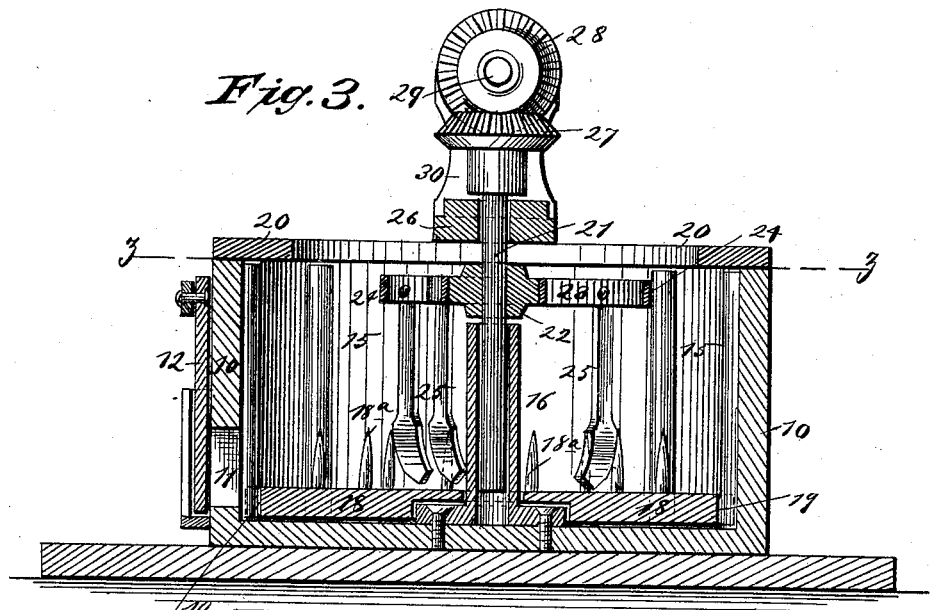
Figure 4:
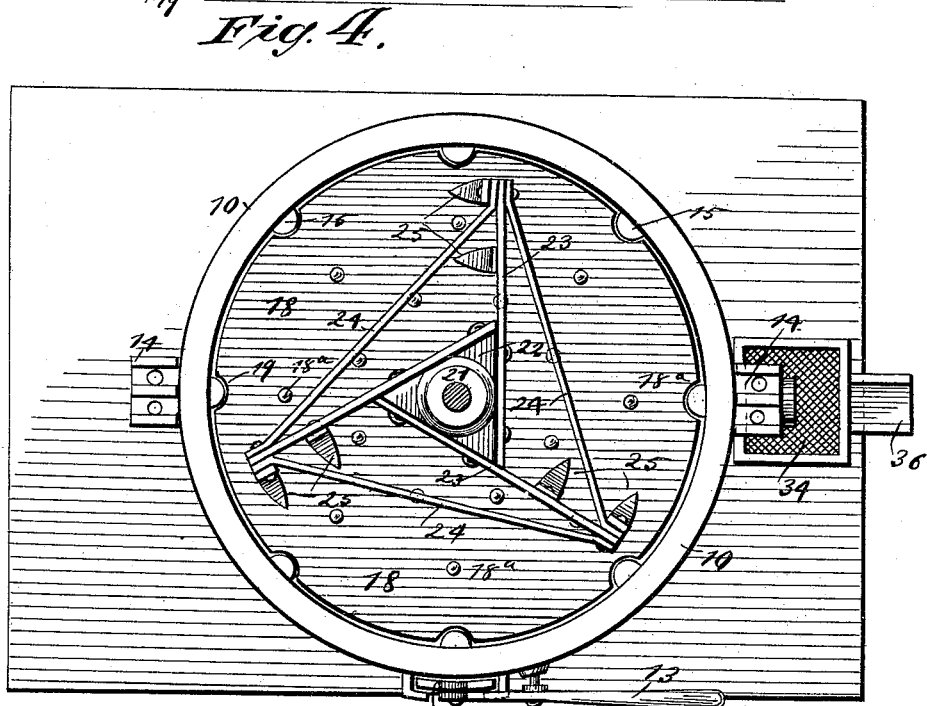

Figure 1 is a plan view of the apparatus. Fig. 2 is a longitudinal section on line $x\ x$ of Fig. 1. Fig. 3 is a transverse section on line $y\ y$ of Fig. 1, and Fig. 4 is a horizontal section taken on line $z\ z$ of Fig. 3.

In carrying out the invention the body of the apparatus consists of a vessel or receptacle 10, preferably cylindrical in contour and having a closed bottom and an open top. In one side of the vessel or receptacle 10 an aperture 11 is produced at or near the bottom, which aperture is closed by means of a gate 12, held to slide upon the outer face of the vessel and manipulated through the medium of a lever 13, fulcrumed upon the said vessel and attached to the said gate, as best illustrated in Fig. 4. Upon the outer surface of the vessel at the top and upon opposite sides brackets 14 are rigidly secured or formed integral therewith, and upon the inner surface of the said vessel a series of vertical ribs 15 is produced. The vessel 10 is further provided with a perpendicular tubular socket 16, rigidly secured to the bottom at the center in any approved manner, and an outlet-tube 17 projects through the side of the vessel beneath one of the brackets 14, as best illustrated in Fig. 2. The vessel 10 is provided with an auxiliary or detachable bottom 18, having a central aperture for the socket 16 and a series of peripheral recesses 19 to receive the ribs 15 when the bottom is inserted in the vessel. From the upper face of said auxiliary bottom a series of pins or stud projections $18^a$ project vertically upward, said pins or stud projections being arranged in concentric circles.

From the foregoing construction it will be observed that the auxiliary bottom when inserted in the receptacle is held stationary, and that the ribs 15 also act to retard the clay, which is given a centrifugal motion in the vessel in the process of cleaning, as will be hereinafter described.

A detachable ring or flange 20 is made to rest upon the upper edge of the vessel 10 and to project a distance inward, as best shown in Figs. 1, 2, and 3, said ring or flange being purposed to prevent the clay, when softened and manipulated, from being thrown out over the side of the vessel.

Within the socket 16 a shaft 21 is journaled, which shaft projects upward beyond the upper edge of the vessel 10, and is made to carry an essentially triangular collar 22 within the said vessel at or near the top, as best illustrated in Figs. 2 and 4. The triangular collar, which is rigidly secured to the shaft 21, is purposed to carry a series of horizontal arms 23, one arm being secured in any approved manner to each side of said collar, as best shown in Fig. 4. The several arms 23 are stayed or strengthened by means of brace-rods 24, extending from arm to arm, three of which brace-rods are ordinarily employed.

To the several arms 23 a series of teeth or stirrers 25 is bolted, which teeth or stirrers project essentially perpendicularly downward, having their lower extremities preferably wider than the body and curved slightly, as illustrated in Figs. 2 and 3, the said teeth or stirrers being so arranged that when the shaft 21 is rotated they will travel in concentric circles between the rows of pins attached to the auxiliary bottom 18. If in practice it is found desirable, teeth or stirrers 25, of similar construction, may be secured to the brace-rods 24 at their intersection with the several arms 23. The upper end of the shaft 21 is journaled in a cross-head 26, which cross-head is bolted or otherwise secured to the brackets 14, as best illustrated in Figs. 1 and 2. The upper end of the shaft 21 is provided with a miter-gear 27, meshing with a similar gear 28, secured upon the inner extremity of a horizontal driving-shaft 29, said driving-shaft being preferably journaled in a standard 30, projected upward from the cross-head, and in an outer standard 31, attached to the base of the apparatus or to the floor or other support of the same. The driving-shaft 29 may be rotated in any suitable or approved manner, and is usually provided with a fast and loose pulley 32 and 33.

At the rear of the vessel 10, immediately beneath the outlet-tube 17, a sieve 34 is located, and beneath said sieve a box 35 is supported, provided with an attached discharge-chute 36. The sieve, box, and chute are preferably attached to the same supporting-frame and are independent of the vessel.

In operation, the shaft 21 having been set in motion, the clay is fed into the vessel at the top of the same in the presence of a constant stream of water, also fed in at the top. As the arms 23 revolve the clay and the water are expeditiously and effectually mingled by being rapidly driven in contact with the ribs 15 and between the pins 18$^a$ of the auxiliary bottom and the stirrers 25. When the vessel has been filled to the proper point, the commingled clay and water, the former being thoroughly washed, is thrown outward by centrifugal force from the outlet-pipe 17, from whence it falls upon the sieve 34, and from thence the screened product passes downward to the box 35 and out through the delivery-chute 36 to any predetermined or desired place.

I desire it to be distinctly understood that I do not confine myself to the exact formation of the stirrers illustrated or the construction of the screen, the receptacle below the screen, or the particular manner illustrated of driving the shaft 21, as other equivalent construction may be employed without departing from the spirit of the invention.

Having thus described my invention, what I claim as new, and desire to secure by Letters Patent, is—

1. The combination, with a vessel having an open top and a detachable auxiliary bottom provided with a series of upwardly-extending pins, of a vertical shaft held to revolve within said vessel, arms horizontally attached to the said shaft, and stirrer-arms projected downward from the horizontal arms, adapted for movement between the pins of the auxiliary bottom, and means for rotating the said shaft, all combined for operation substantially as shown and described.

2. The combination, with a vessel having an open top and provided with a series of interior vertical ribs, a detachable auxiliary bottom held in said receptacle by contact with the said ribs, and a series of concentrically-arranged pins projected upward from the said auxiliary bottom, of a vertical shaft capable of rotation within the vessel, horizontal arms attached to the said shaft, and a series of downwardly-extending stirrer-arms attached to the horizontal arms and adapted for movement between the pins of the auxiliary bottom, substantially as shown and described.

3. The combination, with a vessel having an open top and provided with a series of interior perpendicular ribs, an auxiliary bottom having peripheral recesses to receive the said ribs, and teeth projected upward at intervals from the said auxiliary bottom, of a perpendicular shaft capable of revolving within the said vessel, horizontal arms attached to the said shaft, stirrer-arms projected downward from the horizontal arms, adapted to pass between the teeth of the auxiliary bottom, and a ring attached to the upper portion of the vessel, extending a distance inward, all combined for operation as and for the purpose specified.

4. The combination, with a vessel having an open top and provided with a series of interior perpendicular ribs, a detachable auxiliary bottom provided with peripheral recesses to receive the said ribs, and a series of pins concentrically arranged projecting upward from the said auxiliary bottom, of a perpendicular shaft held to rotate within the vessel, a polygonal casting secured to the said shaft, horizontal arms attached to the sides of the said casting, a series of stirrer-arms projected downward from the said horizontal arms, adapted to pass between the said pins, a guard-ring attached to the upper surface of the vessel projecting inward, and means, substantially as shown and described, for rotating the said shaft, as and for the purpose specified.

5. The combination, with a vessel having an open top and provided with a series of interior perpendicular ribs, an auxiliary bottom provided with peripheral recesses adapted to receive the said ribs, and a series of concentrically-arranged pins attached to the upper surface of the bottom, of a perpendicular shaft capable of revolving within the vessel, a polygonal casting secured to the said shaft, horizontal arms attached to the sides of the said casting, braces connecting the said arms, and a series of stirrer-arms projected from the horizontal arms, all combined for operation substantially as shown and described.

HENERY WOODCOCK.

Witnesses:
ALEXANDER F. PARKER,
C. C. HORNMANN.